T. H. BLAIR.
SHUTTER FOR KINETOSCOPES.
APPLICATION FILED SEPT. 29, 1915.
1,213,147.
Patented Jan. 23, 1917.
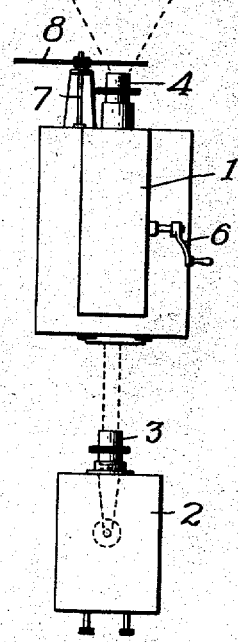
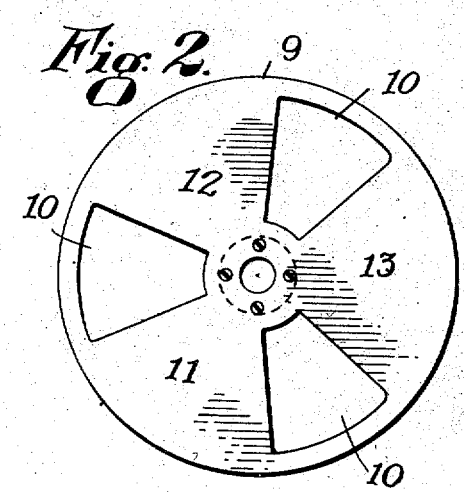
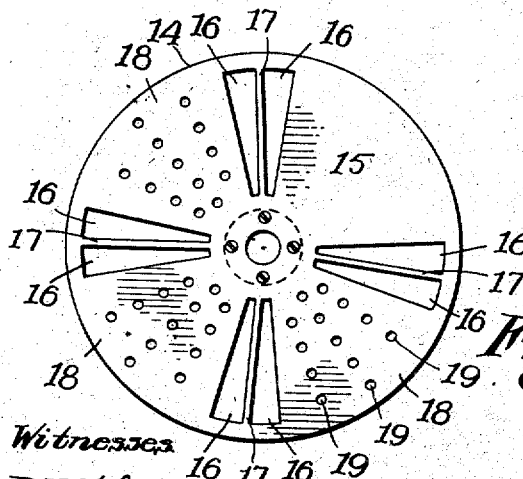
Witnesses
R. D. Tobman
Penelope Comberbach
Inventor
Thomas H. Blair
By Geo. H. Kennedy Jr.
Attorney

UNITED STATES PATENT OFFICE.

THOMAS H. BLAIR, OF NORTHBORO, MASSACHUSETTS.

SHUTTER FOR KINETOSCOPES.

1,213,147.  Specification of Letters Patent.  Patented Jan. 23, 1917.

Application filed September 29, 1915. Serial No. 53,198.

*To all whom it may concern:*

Be it known that I, THOMAS H. BLAIR, a citizen of the United States, residing at Northboro, in the county of Worcester and Commonwealth of Massachusetts, have invented a new and useful Improvement in Shutters for Kinetoscopes, of which the following is a specification accompanied by drawings forming a part of the same.

My present invention relates to a shutter for kinetoscopes by which the screen is alternately obscured and illuminated during the projection of a picture.

My improved shutter, like those now in common use, comprises a revolving disk which is caused to rotate in front of the projecting lens of a kinetoscope, and is provided with an opaque section by which the light is cut off from the screen during the intermittent movement of the film, but it contains certain modifications in structure as herein pointed out, which have for their object to increase the illumination of the screen during the period in which the film remains stationary, and also obviates the unpleasant flickering incident to the projection of pictures upon the screen by the ordinarily practised method.

In the accompanying drawings, Figure 1 represents a plan view of a kinetoscope. Fig. 2 is an elevation of the form of shutter now in common use, and Fig. 3 represents in elevation my improved shutter.

Similar reference characters refer to similar parts in the different figures.

Referring to the drawings, 1 denotes a kinetoscope or motion picture machine which may be of any known construction, 2 denotes a box containing the source of light which passes through a lens 3 and a projecting lens 4 upon a screen 5. In the operation of the kinetoscope a transparent film is made to pass across the path of light with an intermittent motion by means of a mechanism which is actuated by a crank 6. As the operation of the machines of this class is well understood further detailed description of its construction and operation will be unnecessary.

Carried upon the outer end of a revolving shaft 7 is a shutter 8, which extends through the path of light as projected through the lens 4. The shutter 8 contains an opaque section which entirely cuts off the light from the screen 5 during the intermittent motion of the film. The form of shutter now in common use I have represented in Fig. 2 consisting of a disk 9 having openings 10 alternating with the opaque sections 11, 12 and 13. The opaque section 13 is of sufficient width to entirely intercept the light from the screen during the intermittent movement of the film, or while the series of pictures to be projected are being shifted in the kinetoscope. The opaque section by which the screen is obscured, is represented at 13, in Fig. 2. While the film remains at rest and while a given picture of the series is intercepting the rays of light passing through the machine, the openings 10 and the opaque sections 11 and 12 pass in front of the lens 4. During the passage of the openings 10 in front of the lens 4 the picture will appear upon the screen 5, and owing to the persistence of vision the picture will appear to remain in view during the passage of the opaque sections 11, 12 and 13. It has been found necessary, however, in order to produce the desired optical effect to intercept the passage of light during the period that the film remains at rest, and for this purpose the shutter is provided with the opaque sections 11 and 12.

In the form of shutter now in common use, it has been found necessary to properly adjust the relative periods of illumination and obscuration of the screen during the complete revolution of the shutter. The opaque section 13 must be of sufficient size to obscure the screen during the passage of the film between the lenses 3 and 4, but the proportionate size of the opaque sections 11 and 12 relatively to the size of the openings 10 is determined by experiment. If the opaque sections 11 and 12 are too wide, thereby restricting the openings 10, an insufficient amount of light passes the shutter to properly illuminate the picture. If, on the other hand, the openings 10 are unduly large, a flickering effect is produced. Between these extremes, however, it is extremely difficult to secure the adequate illumination of the picture, especially those in which the dark effects predominate and at the same time avoid the disagreeable flickering. This difficulty is increased in the case of machines in which the film is shifted at a comparatively slow speed and the intervals between the shifting of the film is increased. For example, a shutter adapted to be used in a machine projecting sixteen separate pictures upon the screen per second is incapable of use in a machine in which the movement of the film is reduced to eight pictures per second.

By my present invention I provide a shutter for use in kinetoscopes by which the flickering is avoided and by which the picture is adequately illuminated, and I secure these results independently of the speed at which the film is moved, and also independently of the speed at which the shutter is rotated, for it will be understood that the rotation of the shutter is controlled by the movement of the film in order that the obscuration of the screen may occur simultaneously with the shifting of the pictures on the film.

The shutter forming the subject of my present invention is represented in Fig. 3, and it consists of a disk 14 which is mounted upon the shaft 7 and rotated in front of the lens 4 in the same manner as the shutter 8. The disk 14 is provided with an opaque section 15. During the passage of the opaque section 15 in front of the lens 4, the film is shifted, while during the passage of the remaining portion of the shutter in front of the lens 4 the film is at rest, and the picture is being projected upon the screen 5. The disk 14 is provided with a series of openings 16 arranged in pairs and separated by a narrow opaque bar 17. Alternating with the openings 16 are sections 18. Each of the sections 18 is provided with a series of small holes 19 preferably arranged in radial rows, but with the openings in each section in staggered relation to each other, so that the openings in each of the rows of each section will travel in different circular paths. If the disk 14 be revolved in front of the lens 4 and the film shifted during the passage of the opaque section 15 the picture will be projected upon the screen 5 during the passage in front of the lens 4 of the restricted openings 16.

The flickering effect which would be caused by the passage of a larger opening is obviated by a narrow opaque bar 17 extended radially between the openings 16. In my improved shutter the openings 16 are considerably restricted in width from those now in common use and the aggregate area of the sections 18 is increased, while at the same time the adequate illumination of the picture is secured by means of the holes 19, which are so arranged as to distribute the light passing through them with substantial uniformity over the face of the screen. By the use of my improved shutter I have been able to project pictures successfully by the shifting of eight pictures per second, and also to obviate the flickering commonly observed in motion picture machines and at the same time to secure adequate illumination of the screen even in pictures in which dark effects predominate.

Three very desirable results are therefore accomplished by the use of my present invention, first, I am able to reduce the movement of the machine to about one half the speed of the machines now in common use; secondly, I avoid the flickering effects upon the screen; and third, I provide adequate illumination.

While the form of shutter shown in Fig. 3 I consider preferable, I have been made aware by experiment, that slight modifications may be made without departing from the spirit of my invention, and I do not wish therefore to confine myself to the exact proportions which I have shown and described.

I claim,

1. A revolving shutter for kinetoscopes, having a section adapted to completely intercept the light during movement of the film and having a plurality of perforated sections alternating with a plurality of light transmitting sections of less width than said perforated sections, each of said light transmitting sections consisting of a plurality of openings separated by narrow bars.

2. A revolving shutter for kinetoscopes, having a section adapted to completely intercept the light during movement of the film and having a plurality of perforated sections alternating with a plurality of light transmitting sections of less width than said perforated sections, each of said light transmitting sections consisting of a plurality of openings separated by narrow bars of less width than said openings.

3. A revolving shutter for kinetoscopes, having a section adapted to completely intercept the light during movement of the film and having a plurality of light transmitting sections alternating with other sections of greater width than said light transmitting sections, one of said other sections being perforated.

4. A revolving shutter for kinetoscopes, having a section adapted to completely intercept the light during movement of the film and having a plurality of light transmitting sections alternating with other sections of greater width than said light transmitting sections, one of said other sections having a series of holes therethrough.

5. A revolving shutter for kinetoscopes, having a section adapted to completely intercept the light during movement of the film and having a plurality of light transmitting sections alternating with other sections of greater width than said light transmitting sections, some of said other sections having small holes therein.

6. A revolving shutter for kinetoscopes, having a section adapted to completely intercept the light during movement of the film and having a plurality of light transmitting sections alternating with a plurality of other sections, each light transmitting section consisting of a pair of openings separated by a narrow bar.

THOMAS H. BLAIR.

In presence of—
RUFUS B. FOWLER,
PENELOPE COMBERBACH.